United States Patent
Jakkula et al.

(10) Patent No.: US 11,671,679 B2
(45) Date of Patent: Jun. 6, 2023

(54) UNDER-ADDRESSABLE ADVERTISEMENT MEASUREMENT

(71) Applicant: The Nielsen Company (US), LLC, New York, NY (US)

(72) Inventors: Gangadhar Jakkula, Tampa, FL (US); Jean Guerrettaz, Chicago, IL (US); John Charles Coughlin, Oldsmar, FL (US); Paul Chimenti, Tampa, FL (US); Jiji Sadasivakurup, Oldsmar, FL (US); Kimberly I. Gilberti, Oldsmar, FL (US); Samantha M. Mowrer, San Francisco, CA (US); Narasimha Reddy Goli, Tampa, FL (US); Molly Poppie, Arlington Heights, IL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 57 days.

(21) Appl. No.: 17/200,420

(22) Filed: Mar. 12, 2021

(65) Prior Publication Data
US 2021/0204037 A1    Jul. 1, 2021

Related U.S. Application Data

(63) Continuation of application No. PCT/US2020/066689, filed on Dec. 22, 2020.
(Continued)

(51) Int. Cl.
*H04N 21/81* (2011.01)
*H04N 21/24* (2011.01)

(52) U.S. Cl.
CPC ....... *H04N 21/812* (2013.01); *H04N 21/2407* (2013.01)

(58) Field of Classification Search
CPC ........... H04N 21/2407; H04N 21/2547; H04N 21/2668; H04N 21/44204; H04N 21/812; H04N 21/6582
See application file for complete search history.

(56) References Cited

U.S. PATENT DOCUMENTS

| 3,060,398 A1 | 11/2011 | Canning et al. |
| 2007/0038516 A1* | 2/2007 | Apple ............... G06Q 30/02 705/14.42 |

(Continued)

OTHER PUBLICATIONS

Written Opinion and International Search Report issued by the International Searching Authority dated Apr. 9, 2021, in corresponding International Application No. PCT/US2020/066689 (7 pages).
(Continued)

*Primary Examiner* — Chenea Davis
(74) *Attorney, Agent, or Firm* — Hanley, Flight & Zimmerman, LLC

(57) ABSTRACT

Example methods, apparatus, systems and articles of manufacture to implement under-addressable advertisement measurement are disclosed. Example apparatus disclosed herein determine a tuned under-addressable advertisement duration and a total tuned advertisement duration for a first television broadcast at a first monitored site, the tuned under-addressable advertisement duration and the total tuned advertisement duration determined based on (i) return-path tuning data associated with the first monitored site, (ii) linear advertisement log data associated with a broadcast area including the first monitored site, and (iii) addressable advertisement log data associated with the first monitored site. Disclosed example apparatus also determine an under-addressable advertisement factor for the first television broadcast based on the tuned under-addressable advertisement duration and the total tuned advertisement duration, and adjust an input advertisement rating for the first televi-
(Continued)

sion broadcast based on the under-addressable advertisement factor to determine an under-addressable advertisement rating for the first television broadcast.

20 Claims, 9 Drawing Sheets

Related U.S. Application Data

(60) Provisional application No. 62/953,032, filed on Dec. 23, 2019.

(56) References Cited

U.S. PATENT DOCUMENTS

| | | | |
|---|---|---|---|
| 2011/0288907 A1* | 11/2011 | Harvey | G06Q 10/0639 |
| | | | 705/7.29 |
| 2014/0109123 A1 | 4/2014 | Balakrishnan et al. | |
| 2014/0223458 A1 | 8/2014 | Smith et al. | |
| 2018/0131975 A1 | 5/2018 | Badawiyeh et al. | |
| 2019/0364320 A1 | 11/2019 | Kitts et al. | |

OTHER PUBLICATIONS

Patent Cooperation Treaty "International Preliminary Report on Patentability" issued by the International Searching Authority dated Jul. 7, 2022, in corresponding International Application No. PCT/US2020/066689 (5 pages).

* cited by examiner

UNDER-ADDRESSABLE ADVERTISEMENT MEASUREMENT

RELATED APPLICATION(S)

This patent arises from a continuation of PCT Patent Application No. PCT/US2020/066689, which is titled "UNDER-ADDRESSABLE ADVERTISEMENT MEASUREMENT," and which was filed on Dec. 22, 2020, which claims the benefit of U.S. Provisional Application No. 62/953,032, which is titled "UNDER-ADDRESSABLE ADVERTISEMENT MEASUREMENT," and which was filed on Dec. 23, 2019. Priority to U.S. Provisional Application No. 62/953,032 and PCT Patent Application No. PCT/US2020/066689 is claimed. U.S. Provisional Application No. 62/953,032 and PCT Patent Application No. PCT/US2020/066689 are hereby incorporated by reference in their entireties.

FIELD OF THE DISCLOSURE

This disclosure relates generally to audience measurement and, more particularly, to under-addressable advertisement measurement.

BACKGROUND

An addressable commercial provider (ACP) provides advertisement insertion technology for a multichannel video programming distributor (MVPD). Such technology enables addressable advertisements targeted to specific viewers to be played by set top box devices over the existing linear television advertisements intended for all recipients (e.g., viewers) of a television broadcast. However, not all markets, networks, and/or set-top boxes have the capability to play such addressable advertisements. In the absence of the capability to play addressable advertisements, the underlying linear television advertisements will be presented to those recipients (e.g., viewers).

Figure 1:
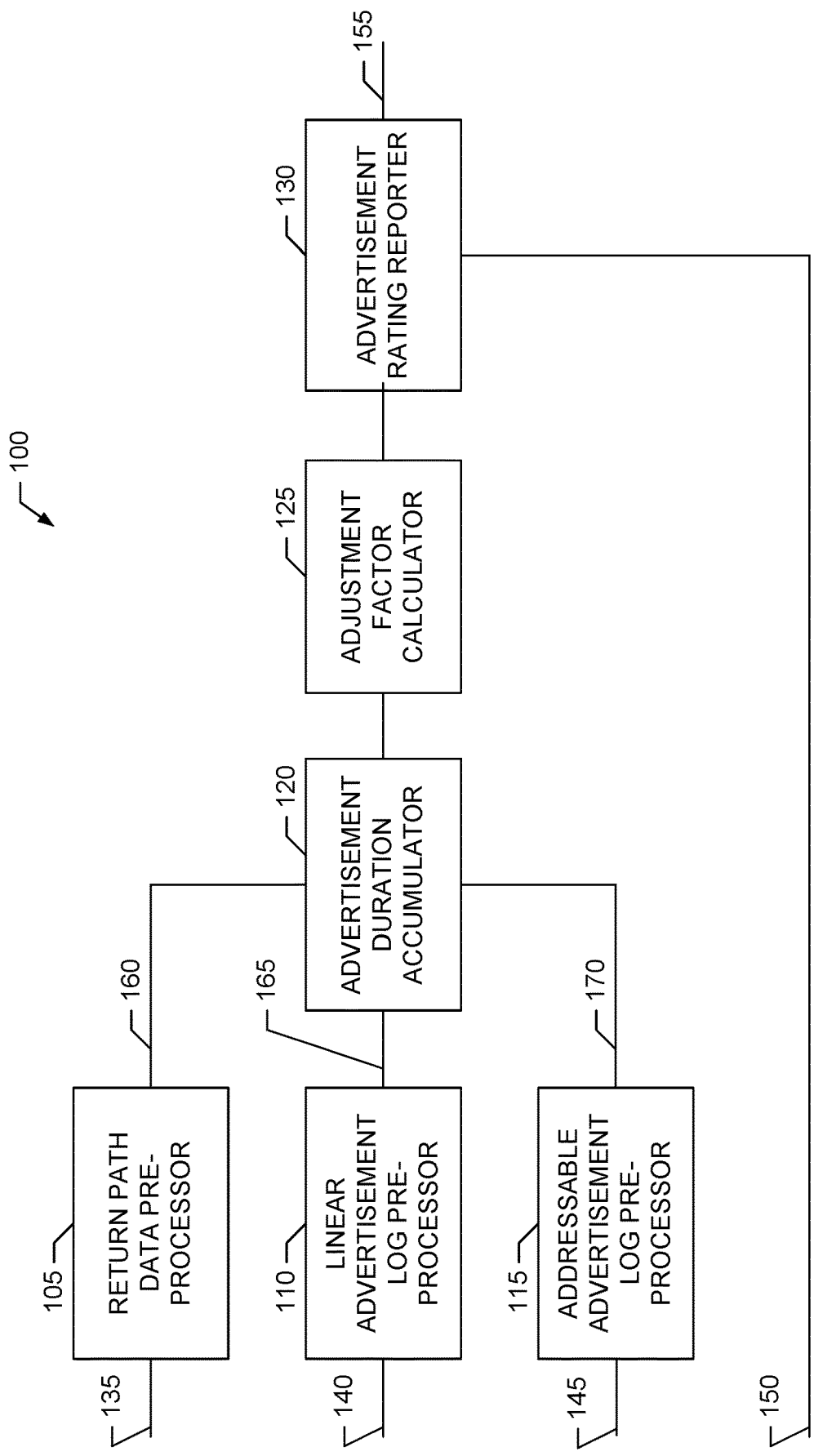
FIG. 1 is a block diagram of an example under-addressable advertisement measurement system implemented in accordance with teachings of this disclosure.

The figures are not to scale. In general, the same reference numbers will be used throughout the drawing(s) and accompanying written description to refer to the same or like parts, elements, etc. As used herein, connection references (e.g., attached, coupled, connected, and joined) are to be construed broadly and may include intermediate members between elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used without imputing or otherwise indicating any meaning of priority, physical order or arrangement in a list, and/or ordering in time in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real-world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Example methods, apparatus, systems and articles of manufacture (e.g., physical storage media) to implement under-addressable advertisement measurement are disclosed herein. Addressable advertisements targeting specific demographic groups are becoming increasingly common in the media landscape. Such addressable advertisements, also referred to as addressable ads, are an important addition to the traditional under-addressable, or linear, advertisements (also referred to as ads) that advertisers have used for decades. Addressable ad technology allows advertisers to dynamically insert an ad, which targets specific viewers of a program, over an existing under-addressable ad scheduled to air during that program. Viewers who are part of the target demographic groups will see the addressable ad, while other viewers will see the under-addressable ad. The introduction of addressable ads introduces a need for measurement of both the addressable and under-addressable ad impressions. For example, advertisers and television networks may both need to know how many people viewed (or, more generally, were exposed to) the addressable ad, and how many people viewed (or, more generally, were exposed to) the under-addressable ad.

Under-addressable ad measurement solution disclosed herein involve the development of an adjustment factor to be generated and used by an Audience Measurement Entity (AME) to report under-addressable and addressable ad impressions within a Multichannel Video Programming Distributor (MVPD) return path data (RPD) capable footprint. In some disclosed examples, the adjustment factor is computed as the ratio of under-addressable ad seconds to total ad seconds viewed for tuned commercial minutes associated with a given television program. The factor is then applied to determine addressable and/or under-addressable impressions (e.g., addressable and/or under-addressable C3 impressions) for an MVPD. The C3 metric is based on the average commercial minute (ACM) rating for live viewing plus time-shifted viewing up to three (3) days. ACM refers to the average minute rating across the total number of minutes of a television program broadcast in which a commercial is also broadcast.

An Addressable Commercial Provider (ACP) is a company that provides ad insertion technology for an MVPD, allowing ads intended to target specific viewers to be played by set-top box devices over traditional linear TV ads. However, not all markets, networks, and households are addressable-capable. As such, an ACP may not currently have a mechanism to isolate the portion of their commercial C3 audience that comes from the non-addressable portion of the MVPD footprint. As a result, they may not be able to provide impression ratings for the under-addressable ads.

Example under-addressable advertisement measurement solutions disclosed herein can fill that gap. Such solutions can provide critical measurement of the under-addressable ad impressions so that clients can make informed decisions about the delivery of their targeted ads and traditional, under-addressable ads.

Under-addressable impressions are computed by determining what proportions of an ad window were viewed as addressable ads vs. under-addressable ads for each program and household device (e.g. set top box). Factors are then created from those proportions that represent the percentage of total ad seconds viewed that were from an under-addressable ad. Each television broadcast (e.g., also referred to as broadcast television program, telecast, etc.) can have its own factor, reflecting the under-addressable ad impressions for that telecast across all households (or, more generally, monitored sites) and devices. In some examples, a telecast is defined by the program and broadcast date.

In some examples, the factors will be shared with the ACP, who will use them to create an MVPD "C3-like" number for their under-addressable ad audience. In some such examples, the ACP will apply the factors to the base C3 impressions included in the MVPD's current custom media information tape (MIT) ratings data, which includes national audiences cut back to MVPD homes, obtained from an AME. In some examples, the final under-addressable advertisement rating (e.g., impression count) is equal to the MVPD C3 rating (e.g., impression count) multiplied by the under-addressable factor computed through the disclosed example under-addressable ad measurement solutions.

Turning to the figures, a block diagram of an example under-addressable advertisement measurement system 100 implemented in accordance with teachings of this disclosure is illustrated in FIG. 1. In the illustrated example, the under-addressable advertisement measurement system 100 includes an example return path data pre-processor 105, an example linear advertisement log pre-processor 110, an example addressable advertisement log pre-processor 115, an example advertisement duration accumulator 120, an example adjustment factor calculator 125 and an example advertisement ratings reporter 130. The return path data pre-processor 105 obtains (e.g., accesses, retrieves, etc.) and pre-processes example return path data (RPD) 135 from set top boxes (and/or any other media devices capable of reporting RPD) from which under-addressable ad ratings are to be determined. The linear advertisement log pre-processor 110 obtains (e.g., accesses, retrieves, etc.) and pre-processes example linear advertisement log data 140 from an ACP. For example, the linear advertisement log data 140 may provide a schedule of linear advertisements to be broadcast by the MVPD in a broadcast area (e.g., physical geographic area, logical distribution area, etc.) including the monitored sites (e.g., set top boxes) providing the RPD data. The addressable advertisement log pre-processor 115 obtains (e.g., accesses, retrieves, etc.) and pre-processes addressable advertisement log data from an ACP. For example, the addressable advertisement log data may provide logs of the addressable ads provided to and/or played at the monitored sites (e.g., by the set top boxes) providing the RPD data. Further details concerning the return path data pre-processor 105, the linear advertisement log pre-processor 110, and the addressable advertisement log pre-processor 115 are provided below.

The advertisement duration accumulator 120 of the illustrated example processes the RPD data from the return path data pre-processor 105, the linear ad log data from the linear advertisement log pre-processor 110, and the addressable ad log data from the addressable advertisement log pre-processor 115 to determine respective tuned under-addressable advertisement durations and respective total tuned advertisement durations for respective ones of the monitored sites (e.g., set top boxes) and respective ones of the television broadcasts represented in the RPD. In some examples, the advertisement duration accumulator 120 also determines respective tuned addressable advertisement durations for respective ones of the monitored sites (e.g., set top boxes) and respective ones of the television broadcasts represented in the RPD. For example, for a first monitored site (e.g., set top box) represented in the RPD, the advertisement duration accumulator 120 may determine a tuned addressable advertisement duration, a tuned under-addressable advertisement duration and a total tuned advertisement duration for a first television broadcast presented at a first monitored site. In some examples, the tuned addressable advertisement duration for a given monitored site (e.g., given set top box) and given television broadcast (e.g., given telecast) is the total duration of time that addressable advertisement(s) were tuned at that monitored site (e.g., by that set top box) during that television broadcast (e.g., given telecast). Similarly, in some examples, the tuned under-addressable advertisement duration for a given monitored site (e.g., given set top box) and given television broadcast (e.g., given telecast) is the total duration of time that linear advertisement(s) were tuned at that monitored site (e.g., by that set top box) during that television broadcast (e.g., given telecast). Similarly, in some examples, the total tuned advertisement duration for a given monitored site (e.g., given set top box) and given television broadcast (e.g., given telecast) is the total duration that advertisement(s) (addressable and/or linear) were tuned at that monitored site (e.g., by that set top box) during that television broadcast (e.g., given telecast). In some such examples, the addressable advertisement duration, the under-addressable advertisement duration and the total tuned advertisement duration for the first television broadcast are determined based on (i) RPD associated with the first monitored site, (ii) linear advertisement log data associated with the broadcast area including the first monitored site, and (iii) addressable advertisement log data associated with the first monitored site. Further details concerning the advertisement duration accumulator 120 are provided below.

The adjustment factor calculator 125 of the illustrated example determines respective under-addressable advertisement factors for respective ones of the television broadcasts (e.g., television programs, telecasts, etc.) represented in the RPD. The adjustment factor calculator 125 determines the respective under-addressable advertisement factors based on the respective tuned under-addressable advertisement durations and the respective total tuned advertisement durations determined by the advertisement duration accumulator 120 for the respective ones of the monitored sites (e.g., set top boxes) and the respective ones of the television broadcasts represented in the RPD. For example, for a first television broadcast represented in the RPD, the adjustment factor calculator 125 aggregates the respective tuned under-addressable advertisement durations for the first television broadcast as determined by the advertisement duration accumulator 120 for corresponding ones of the monitored sites (e.g., set top boxes) represented in the RPD to determine an aggregate tuned under-addressable advertisement duration for the first television broadcast. In this example, the adjustment factor calculator 125 also aggregates the respective total tuned advertisement durations for the first television broadcast as determined by the advertisement duration accumulator 120 for corresponding ones of the monitored sites (e.g., set top boxes) represented in the RPD to determine an aggregate total tuned advertisement duration for the first television broadcast. In this example, the adjustment factor calculator 125 further divides the aggregate tuned under-addressable advertisement duration for the first television broadcast by the aggregate total tuned advertisement duration for the first television broadcast to determine an under-addressable advertisement factor for the first television broadcast. Further details concerning the adjustment factor calculator 125 are provided below.

The advertisement ratings reporter 130 of the illustrated example adjusts example input ratings data 150 for respective ones of the television broadcasts represented in the RPD data to determine example under-addressable advertisement ratings data 155 for the respective ones of the television broadcasts. In the illustrated example, the advertisement ratings reporter 130 may multiply (or, in other words, scale) the input ratings data 150 for respective ones of the television broadcasts by the corresponding under-addressable advertisement factors determined by the adjustment factor calculator 125 for the respective ones of the television broadcasts to determine the under-addressable advertisement ratings data 155 for the respective ones of the television broadcasts. For example, for a first television broadcast represented in the RPD, the advertisement ratings reporter 130 may multiply the input rating data 150 for that first television broadcast by the under-addressable advertisement factor determined for that first television broadcast to determine the under-addressable advertisement rating 155 for that first television broadcast. In some examples, the input ratings data is the base C3 rating (e.g., C3 impression count) for that first television broadcast, as described above. In some examples, the under-addressable advertisement rating 155 is used by one or more downstream processing devices to adjust the addressable advertisement delivery to improve efficiency.

As mentioned above, the return path data pre-processor 105 obtains (e.g., accesses, retrieves, etc.) and pre-processes the RPD 135 to generate example pre-processed RPD data 160 for use by the advertisement duration accumulator 120. For example, an AME, such as The Nielsen Company (US), LLC, may reach agreements with pay-television provider companies, such as an MVPD, to obtain the television tuning information derived from set top boxes, which is referred to herein, and in the industry, as RPD. Set-top box (STB) data includes some or all the data collected by the set-top box. STB data may include, for example, tuning events and/or commands received by the STB (e.g., power on, power off, change channel, change input source, start presenting media, pause the presentation of media, record a presentation of media, volume up/down, etc.). STB data may additionally or alternatively include commands sent to a content provider by the STB (e.g., switch input sources, record a media presentation, delete a recorded media presentation, the time/date a media presentation was started, the time a media presentation was completed, etc.), heartbeat signals, and/or the like. The set-top box data may additionally or alternatively include a household identification (e.g. a household ID) and/or a STB identification (e.g. a STB ID).

Return path data includes any data receivable at a media service provider (e.g., a such as a cable television service provider, a satellite television service provider, a streaming media service provider, a content provider, etc.) via a return path to the service provider (e.g., MVPD) from a media consumer site. As such, return path data includes at least a portion of the set-top box data. Return path data may additionally or alternatively include data from any other consumer device with network access capabilities (e.g., via a cellular network, the internet, other public or private networks, etc.). For example, return path data may include any or all of linear real time data from an STB, guide user data from a guide server, click stream data, key stream data (e.g., any click on the remote—volume, mute, etc.), interactive activity (such as Video On Demand) and any other data (e.g., data from middleware). RPD data can additionally or alternatively be from the network (e.g., via Switched Digital software) and/or any cloud-based data (such as a remote server DVR) from the cloud.

In some examples, the return path data pre-processor 105 pre-processes the RPD 135 to exclude those monitored sites (e.g., set top boxes) determined to be out of compliance (also referred to as out-of-tab) based on one or more criteria. The return path data pre-processor 105 may also pre-process the RPD 135 to identify the television broadcasts tuned at respective monitored sites (e.g., by respective set top boxes). In the illustrated example, the return path data pre-processor 105 further performs minute exploding of the RPD 135 such that each entry (e.g., row) of the pre-processed RPD 160 represents a single tuning minute for a particular combination of monitored site (e.g., set top box) and television broadcast. If a monitored site has multiple set top boxes, the pre-processed RPD 160 for that monitored site may be such that each entry (e.g., row) represents a single tuning minute for a particular combination of the monitored site, set top box, and television broadcast. An example of pre-processed RPD 160 that may be output by the return path data pre-processor 105 is illustrated in Table 3 below.

As mentioned above, the linear advertisement log pre-processor 110 obtains (e.g., accesses, retrieves, etc.) and pre-processes the linear ad log data 140 to generate example pre-processed linear ad log data 165 for use by the advertisement duration accumulator 120. Linear ads, also referred to as under-addressable ads, are traditional ads that have long been part of linear television broadcasting. In linear advertising, the same ad is served to all viewers of a telecast. The linear ads are typically grouped into ad windows, also referred to as ad pods, according to a schedule for inclusion in television broadcasts. Thus, the linear ad log data 140 includes a schedule of under-addressable ads, and these ads play "under" any addressable ads.

In contrast, addressable ads are dynamic ads inserted over (e.g., overwriting) the scheduled linear ads. Because the addressable ads are inserted over the linear ads, the linear ads are said to be under the addressable ads. Hence, linear ads are also referred to as under-addressable ads. Typically, addressable ads target specific viewer demographics. If an addressable ad is served, it will play over the under-addressable ad so that the underlying linear ad is not viewed. If no addressable ad is served for some or all portions of an ad window, then the underlying under-addressable ad(s) is/are served. In some examples, there are roughly two minutes per hour of insertable time, but that number can vary depending on the program/network. A linear ad scheduled to air during that time can be overwritten by the set-top box with an addressable ad to be served to the corresponding monitored site (e.g., household). However, a linear ad, rather than an addressable ad, may appear during the insertable time for any number of reasons. For example, the set top box may not have the capability to present an addressable ad (e.g., it may not be a high definition set top box with digital video recorder—DVR—capabilities), the current network being tuned by the set top box may not be an addressable network (e.g., it may be a standard definition network rather than a high definition network), the monitored site (e.g., household) may not meet the demographic target for the addressable ad, etc.

Thus, the linear ad log data 140 provides a schedule of under-addressable (linear) ads served for each telecast. However, the linear ad log data 140 does not indicate whether the ad was presented/viewed. (The RPD tuning data is used to determine whether a particular linear ad was presented at a particular monitored site, e.g., by a particular set top box.) In some examples, the linear advertisement log pre-processor 110 pre-processes the linear ad log data 140 by performing minute exploding such that each entry of the pre-processed linear ad lo data 165 represents a single tuning minute for a particular linear advertisement and television broadcast. In some examples, the linear advertisement log pre-processor 110 also pre-processes the linear ad log data 140 to remove duplicate entries, as the linear ad log data can include duplicate entries (e.g., rows) that should be removed. Also, linear ads can have varying degrees of overlap, where two ads for the same telecast will overlap for some number of seconds. If those overlaps are not accounted for, the overlapped seconds can be counted more than once, inflating the under-addressable ad impressions. As such, the linear advertisement log pre-processor 110 can create a linear ad pod to identify consecutive ads and ads that overlap. Note that the linear ad log data is at the telecast level because all monitored sites (e.g., set top boxes and other devices) are served the same linear ads for each television program and date.

Thus, in some examples, the linear advertisement log pre-processor 110 segments the linear advertisement log data to have first log entries with one-minute granularities (or some other time granularity). Then, the linear advertisement log pre-processor 110 aggregates ones of the first log entries for a group of linear advertisements included in a single linear advertisement pod to determine second log entries for the linear advertisement pod. In some such examples, the second log entries also have one-minute granularities (or some other time granularity). In some examples, the advertisement duration accumulator 120 is to determine the under-addressable advertisement durations and the total tuned advertisement durations for different telecasts based, at least in part, on the second log entries.

An example format for entries of the pre-processed linear ad log data 165 is provided in Table 1.

TABLE 1

| Field | Description |
| --- | --- |
| Viewing Source | Persistent Viewing Source ID that can be tied back to the tuning data |
| Ad ID | Unique identifier for the ad served |
| Ad Start Time | Start time of ad in HH:MM:SS format |
| Ad End Time | End time of ad in HH:MM:SS format |

As mentioned above, the addressable advertisement log pre-processor 115 obtains (e.g., accesses, retrieves, etc.) and pre-processes the addressable ad log data 145 to generate example pre-processed addressable ad log data 170 for use by the advertisement duration accumulator 120. The addressable ad log data 145 provides the schedule of addressable ads served for each monitored site (e.g., set top box) and telecast combination. In some examples, the addressable ad log data 145 also provides the respective durations for which the addressable ads were presented (tuned) at the monitored site (e.g., by the set top box). However, in some examples, the addressable ad log data 145 does not indicate whether a particular addressable ad was presented/viewed at a particular monitored site (e.g., by a particular set top box). In such examples, the RPD tuning data is used to determine whether a particular addressable ad was presented at the particular monitored site, e.g., by the particular set top box. In some examples, the addressable advertisement log pre-processor 115 pre-processes the addressable ad log data 145 by performing minute exploding such that each entry of the pre-processed addressable ad log data 165 represents a single tuning minute for a particular addressable advertisement, television broadcast and monitored site (e.g., set top box). The addressable ad log data can include duplicate entries (e.g., rows) that should be removed. Also, addressable ads can have varying degrees of overlap, where two ads for the same monitored site (e.g., set top box) and telecast will overlap for some number of seconds. If those overlaps are not accounted for, the overlapped seconds can be counted more than once, inflating the addressable ad impressions. As such, the addressable advertisement log pre-processor 115 can create an addressable ad pod to identify consecutive ads and ads that overlap. Note that the addressable ad log data is at the monitored site (e.g., set top box) and telecast level (or the monitored site, set top box and telecast level of there are multiple set top boxes at the monitored site) because targeted monitored sites (e.g., targeted set top boxes) are served distinct addressable ads for a program and date based on viewer demographics.

In some examples, the addressable advertisement log pre-processor 115 applies a qualification rule to the addressable ads included in the addressable ad log data. For example, the qualification rule may classify a given addressable ad that was tuned (e.g., presented) at a given monitored site as unqualified if the addressable ad was tuned at that monitored site for less than a qualification threshold duration (e.g., such as 6 seconds or some other duration). In some examples, unqualified addressable ads are excluded from computation of any tuned addressable advertisement durations for a given monitored site and telecast. However, unqualified addressable ads may still be included in computation of any total tuned advertisement durations for a given monitored site and telecast.

Thus, in some examples, the addressable advertisement log pre-processor 115 segments the addressable advertisement log data to have first log entries with one-minute granularities. In some examples, the addressable advertisement log pre-processor 115 also identifies ones of the first log entries associated with one or more addressable advertisements having respective tuned durations that do not satisfy a qualification threshold (e.g., are tuned/presented for less than the qualification threshold, such as 6 seconds or some other value), and classifies those log entries as unqualified log entries. In some examples, the addressable advertisement log pre-processor 115 further aggregates ones of the first log entries for a group of addressable advertisements included in a single addressable advertisement pod to determine second log entries for the addressable advertisement pod. In some such examples, the second log entries also have one-minute granularities. In some examples, the advertisement duration accumulator 120 is to determine total tuned advertisement durations for different telecasts based, at least in part, on the second log entries.

An example format for entries of the pre-processed addressable ad log data 175 is provided in Table 2.

TABLE 2

| Field | Description |
|---|---|
| STB ID | Persistent STB ID that can be tied back to the tuning data |
| Viewing Source | Persistent Viewing Source ID that can be tied back to the tuning data |
| Ad ID | Unique identifier for the ad served |
| Start Time | Tuning start time of ad in HH:MM:SS format |
| Duration Tuned | Duration of the ad that was tuned on the set top box |

Figure 2:
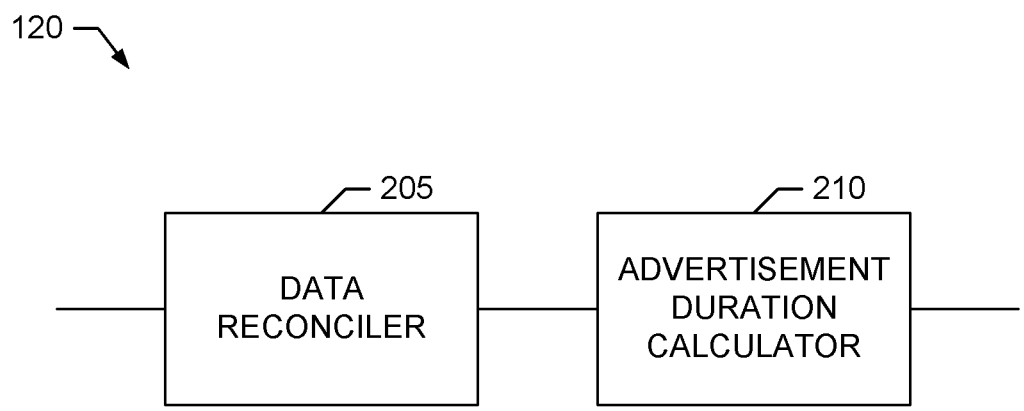
FIG. 2 is a block diagram of an example advertisement duration accumulator that may be used to implement the example under-addressable advertisement measurement system of FIG. 1.

A block diagram of an example implementation of the advertisement duration accumulator 120 of FIG. 1 is illustrated in FIG. 2. In the illustrated example, the advertisement duration accumulator 120 includes an example data reconciler 205 and an example advertisement duration calculator 210. The data reconciler 205 merges the RPD tuning data 160, the linear ad log data 165, and the addressable ad log data 170 (e.g., at the minute level or some other time granularity) to create a dataframe of tuned commercial minutes. Commercial minutes refer to tuning minutes with any number of scheduled linear ad seconds. In the illustrated example, only commercial minutes are relevant for computing the under-addressable factors, and program minutes do not include any ad seconds.

In some examples, the data reconciler 205 merges the RPD tuning data 160 and the linear ad log data 165 to create program coded RPD tuning data, in which each RPD data entry (e.g., at the minute level) is coded as corresponding to either a commercial or a television program (e.g., telecast, television broadcast, etc.) An example of such program coded RPD tuning data, which results from the merging of the RPD tuning data 160 and the linear ad log data 165, is provided in Table 3, and is based on example linear ad log data provided in Table 4. The example program coded RPD tuning data of Table 1 includes entries for two STBs (STB 1 with Box ID=1 and STB 2 with Box ID=2) corresponding to two different monitored sites, with entries having row identifiers 1 to 7 being representative of STB 1, and entries having row identifiers 8 to 10 being representative of STB 2.

TABLE 3

Example program coded RPD tuning data

| Row | Box ID | Telecast Date | Viewing Source | Program | Minute | Tuned | Content |
|---|---|---|---|---|---|---|---|
| 1 | 1 | Jul. 20, 2019 | HGTV | House Hunters | 8:01 p | Y | Program |
| 2 | 1 | Jul. 20, 2019 | HGTV | House Hunters | 8:02 p | Y | Program |
| 3 | 1 | Jul. 20, 2019 | HGTV | House Hunters | 8:03 p | Y | Program |
| 4 | 1 | Jul. 20, 2019 | HGTV | House Hunters | 8:04 p | Y | Program |
| 5 | 1 | Jul. 20, 2019 | HGTV | House Hunters | 8:05 p | Y | Commercial |
| 6 | 1 | Jul. 20, 2019 | HGTV | House Hunters | 8:06 p | Y | Commercial |
| 7 | 1 | Jul. 20, 2019 | HGTV | House Hunters | 8:07 p | Y | Commercial |
| 8 | 2 | Jul. 20, 2019 | HGTV | House Hunters | 8:06 p | Y | Commercial |
| 9 | 2 | Jul. 20, 2019 | DISCOVERY | Dateline | 8:07 p | Y | Program |
| 10 | 2 | Jul. 20, 2019 | DISCOVERY | Dateline | 8:08 p | Y | Program |

TABLE 4

Example linear ad log data

| Row | Telecast Date | Viewing Source | Program | Start Time | End Time |
|---|---|---|---|---|---|
| 1 | Jul. 20, 2019 | HGTV | House Hunters | 8:05:00p | 8:05:30p |
| 2 | Jul. 20, 2019 | HGTV | House Hunters | 8:05:30p | 8:05:45p |
| 3 | Jul. 20, 2019 | HGTV | House Hunters | 8:05:45p | 8:06:15p |
| 4 | Jul. 20, 2019 | HGTV | House Hunters | 8:06:15p | 8:06:45p |
| 5 | Jul. 20, 2019 | HGTV | House Hunters | 8:06:45p | 8:07:15 |

The example program coded RPD tuning data of Table 3 assumes that the return path data pre-processor 135 filtered the input RPD data 135 to retain entries corresponding to live tuning (and discarded any time-shifted tuning), excluded entries corresponding to television off events, machine events, etc., excluded entries that did not meet one or more compliance criteria (e.g., corresponding to STBs that are out-of-tab), etc. The example linear ad log data of Table 4 assume that the input linear ad log data 140 provides a schedule of linear ads for the relevant broadcast area (e.g., the geographical and/or logical footprint corresponding to the input RPD 135, also referred to as the RPD footprint). Also, the example linear ad log data of Table 4 is not filtered to what was tuned by a given set top box, but rather what linear ad would have been presented if the set top box tuned to the program (e.g., viewing source) at the scheduled time. To merge the input RPD 135 with the example linear ad log data of Table 4, the data reconciler 205 assumes that (i), if a linear ad is overlaid with an addressable ad by a given STB, the linear ad will not be tuned by that STB, and (ii) if an addressable ad is not presented by the STB over a scheduled linear ad, the scheduled linear ad will be presented by that STB. In some examples, program and commercial coding designations in the program coded RPD (e.g., see the example of Table 3) are for informational purposes only. In some such examples, if a given minute is designated as a program minute, that program minute is still included in the computation of the factor(s) disclosed herein if, for example, a commercial appears in the ad log and the STB is tuned to the associated viewing source at the scheduled time of the commercial.

In some examples, the data reconciler 205 next reconciles the program coded RPD tuning data with the addressable ad log data 170 to determine program coded ad tuning data. An example of such program coded ad tuning data, which results from the merging of the example program coded RPD tuning data of Table 3 and the addressable ad log data 170, is provided in Table 6, and is based on example addressable ad log data provided in Table 5.

TABLE 5

Example addressable log data

| Row | Box ID | Telecast Date | Viewing Source | Program | Tuned Start | Tuned End |
|---|---|---|---|---|---|---|
| 1 | 1 | Jul. 20, 2019 | HGTV | House Hunters | 8:05:00 p | 8:05:30 p |
| 2 | 1 | Jul. 20, 2019 | HGTV | House Hunters | 8:05:45 p | 8:06:15 p |
| 3 | 1 | Jul. 20, 2019 | HGTV | House Hunters | 8:06:15 p | 8:06:45 p |
| 4 | 2 | Jul. 20, 2019 | HGTV | House Hunters | 8:06:15 p | 8:06:45 p |
| 5 | 2 | Jul. 20, 2019 | HGTV | House Hunters | 8:06:45 p | 8:06:50 p |

TABLE 6

Example program coded ad tuning data

| Row | Box ID | Telecast Date | Viewing Source | Program | Minute | Tuned | Address | Under-Add | Other | Total |
|---|---|---|---|---|---|---|---|---|---|---|
| 1 | 1 | Jul. 20, 2019 | HGTV | House Hunters | 8:01 p | Y | 0 | 0 | 60 | 60 |
| 2 | 1 | Jul. 20, 2019 | HGTV | House Hunters | 8:02 p | Y | 0 | 0 | 60 | 60 |
| 3 | 1 | Jul. 20, 2019 | HGTV | House Hunters | 8:03 p | Y | 0 | 0 | 60 | 60 |
| 4 | 1 | Jul. 20, 2019 | HGTV | House Hunters | 8:04 p | Y | 0 | 0 | 60 | 60 |
| 5 | 1 | Jul. 20, 2019 | HGTV | House Hunters | 8:05 p | Y | 45 | 15 | 0 | 60 |
| 6 | 1 | Jul. 20, 2019 | HGTV | House Hunters | 8:06 p | Y | 45 | 15 | 0 | 60 |
| 7 | 1 | Jul. 20, 2019 | HGTV | House Hunters | 8:07 p | Y | 0 | 15 | 45 | 60 |
| 8 | | Jul. 20, 2019 | HGTV | House Hunters | 8:01 p | N | | | | |
| 9 | | Jul. 20, 2019 | HGTV | House Hunters | 8:02 p | N | | | | |
| 10 | | Jul. 20, 2019 | HGTV | House Hunters | 8:03 p | N | | | | |
| 11 | | Jul. 20, 2019 | HGTV | House Hunters | 8:04 p | N | | | | |

TABLE 6-continued

Example program coded ad tuning data

| Row | Box ID | Telecast Date | Viewing Source | Program | Minute | Tuned | Address | Under-Add | Other | Total |
|---|---|---|---|---|---|---|---|---|---|---|
| 12 | | Jul. 20, 2019 | HGTV | House Hunters | 8:05 p | N | | | | |
| 13 | 2 | Jul. 20, 2019 | HGTV | House Hunters | 8:06 p | Y | 30 | 25 | 5 | 60 |

The example addressable ad log data of Table 5 assume that the input addressable ad log data 145 identifies what addressable ads were tuned by a given set top box. Also, the start and end time of a given addressable ad for a given set top box are based on what was tuned by that set top box, not the original duration of the addressable ad spot. Further, the example addressable ad log data of Table 5 assumes that any ads other than addressable ads are filtered out before the addressable ad log data 145 is program coded with viewing source/program identification information. Thus, all ads in the addressable ad log data 145 are assumed to be addressable ads. Also, when merging the example program coded RPD tuning data of Table 3 with the example addressable ad log data provided in Table 5, the data reconciler 205 assumes that the addressable ads are sufficient to cover a corresponding linear ad, but can vary in duration. For example, a 30 second linear ad can be overlaid with two 15 second addressable ads.

The example, resulting program coded ad tuning data of Table 6 illustrates several characteristics of the merging operations performed by the data reconciler 205. For example, based on the example program coded RPD tuning data of Table 3 and the example linear ad log data of FIG. 4, the data reconciler 205 ascertains that insertable ad times were scheduled from 8:05:00 PM to 8:07:15 PM in this example. The example addressable ad log data of Table 5, as determined by the data reconciler 205, indicates that STB 1 (corresponding to a first monitored site) and STB 2 (corresponding to a second monitored site) tuned to addressable ads during different portions of this ad break. For example, STB 2 stops presenting (e.g., possibly due to a channel change or other tuning event) the final addressable ad of the ad block 5 seconds into the final addressable ad (see row 5 of Table 5). In the illustrated example, a qualification threshold of 6 seconds is employed to exclude any addressable ads that are not tuned for at least that thresholds from being counted in the addressable ad duration and the under-addressable ad duration. Thus, in the example of Table 6, those 5 seconds for STB 2 are classified as Other (see row 13 of Table 6).

The advertisement duration calculator 210 of the illustrated example processes the program coded ad tuning data output from the data reconciler 205 to determine tuned advertisement durations, such as (i) tuned addressable advertisement durations, (ii) tuned under-addressable advertisement durations, and (iii) total tuned advertisement durations, for each monitored site, STB and telecast combination represented in the program coded ad tuning data. In the illustrated example, the advertisement duration calculator 210 determines the tuned addressable advertisement durations by accumulating the individual addressable ad durations represented in the program coded ad tuning data to the minute×monitored site×STB×telecast×addressable ad pod level. The advertisement duration calculator 210 then accumulates that addressable ad duration data to the minute×monitored site×STB×telecast level, and accumulates the result over the minute-level entries to yield the tuned addressable advertisement durations at the monitored site× STB×telecast level (e.g., to support scenarios in which there may be multiple STBs per monitored site). In some examples, the advertisement duration calculator 210 includes both qualified and unqualified addressable ad tuning entries in the computation of the tuned addressable advertisement durations. However, in some examples, the advertisement duration calculator 210 includes just qualified addressable ad tuning entries (e.g., representing addressable ads that were tuned for at least the qualification threshold, such as 6 seconds) in the computation of the tuned addressable advertisement durations. In some example, the advertisement duration calculator 210 computes separate qualified tuned addressable advertisement durations at the monitored site×STB×telecast level, which include just the qualified addressable ad tuning entries (e.g., representing addressable ads that were tuned for at least the qualification threshold, such as 6 seconds).

In the illustrated example, the advertisement duration calculator 210 determines the tuned under-addressable advertisement durations by accumulating the individual under-addressable ad durations represented in the program coded ad tuning data to the minute×monitored site×STB× telecast. The advertisement duration calculator 210 then accumulates the result over the minute-level entries to yield the tuned under-addressable advertisement durations at the monitored site×STB×telecast level. In the illustrated example, the advertisement duration calculator 210 then accumulates the tuned addressable advertisement durations at the monitored site×STB×telecast level with the tuned under-addressable advertisement durations at the monitored site×STB×telecast level to determine the tuned total advertisement durations at the monitored site×STB×telecast level.

An example of tuned advertisement durations, such as (i) tuned addressable advertisement durations, (ii) tuned under-addressable advertisement durations, and (iii) total tuned advertisement durations, determined by the advertisement duration calculator 210 for each monitored site, STB and telecast combination represented in the example program coded ad tuning data of Table 6 is illustrated in Table 7.

TABLE 7

Example tuned advertisement durations

| Row | Box ID | Telecast Date | Viewing Source | Program | Total Addressable | Total Under-Addressable | Total Seconds |
|---|---|---|---|---|---|---|---|
| 1 | 1 | Jul. 20, 2019 | HGTV | House Hunters | 90 | 45 | 135 |
| 2 | 2 | Jul. 20, 2019 | HGTV | House Hunters | 30 | 25 | 55 |

As shown in example of Table 7, the advertisement duration calculator 210 accumulates the individual addressable ad durations included in entries 5 to 7 of Table 6 for minutes 8:05 PM to 8:07 PM during which STB 1 tuned to the "House Hunters" telecast to obtain a tuned addressable advertisement duration of 90 seconds for STB 1 and the "House Hunters" telecast, as shown in Table 7. Likewise, the advertisement duration calculator 210 accumulates the individual addressable ad durations included in entry 13 of Table 6 for minute 8:06 PM during which STB 2 tuned to the "House Hunters" telecast to obtain a tuned addressable advertisement duration of 30 seconds for STB 2 and the "House Hunters" telecast. Also, in this example, the advertisement duration calculator 210 accumulates the individual under-addressable ad durations included in entries 5 to 7 of Table 6 for minutes 8:05 PM to 8:07 PM during which STB 1 tuned to the "House Hunters" telecast to obtain a tuned under-addressable advertisement duration of 45 seconds for STB 1 and the "House Hunters" telecast, as shown in Table 7. Likewise, the advertisement duration calculator 210 accumulates the individual under-addressable ad durations included in entry 13 of Table 6 for minute 8:05 PM to 8:06 PM during which STB 2 tuned to the "House Hunters" telecast to obtain a tuned under-addressable advertisement duration of 25 seconds for STB 2 and the "House Hunters" telecast. Further, in this example, the advertisement duration calculator 210 accumulates the tuned addressable advertisement duration of 90 seconds for STB 1 and the "House Hunters" telecast with the tuned under-addressable advertisement duration of 45 seconds for STB 1 and the "House Hunters" telecast to obtain a tuned total advertisement duration of 135 seconds for STB 1 and the "House Hunters" telecast, as shown in Table 7. Likewise, the advertisement duration calculator 210 accumulates the tuned addressable advertisement duration of 30 seconds for STB 2 and the "House Hunters" telecast with the tuned under-addressable advertisement duration of 25 seconds for STB 2 and the "House Hunters" telecast to obtain a tuned total advertisement duration of 55 seconds for STB 2 and the "House Hunters" telecast, as shown in Table 7.

Figure 3:
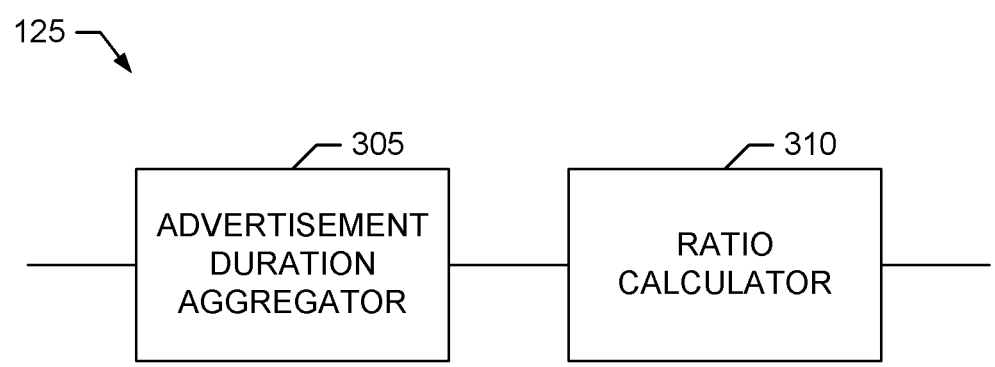
FIG. 3 is a block diagram of an example adjustment factor calculator that may be used to implement the example under-addressable advertisement measurement system of FIG. 1.

A block diagram of an example implementation of the adjustment factor calculator 125 of FIG. 1 is illustrated in FIG. 3. In the illustrated example, the adjustment factor calculator 125 includes an example advertisement duration aggregator 305 and an example ratio calculator 310. The advertisement duration aggregator 305 aggregates the tuned advertisement durations, such as (i) the tuned addressable advertisement durations, (ii) the tuned under-addressable advertisement durations, and (iii) the total tuned advertisement durations, determined by the advertisement duration accumulator 120 to the telecast level. For example, the advertisement duration aggregator 305 determines the aggregate tuned addressable advertisement duration for a given telecast by accumulating the tuned addressable ad durations determined by the advertisement duration accumulator 120 for that telecast across the monitored site×STB combinations. The advertisement duration aggregator 305 determines the aggregate tuned under-addressable advertisement duration for a given telecast by accumulating the tuned under-addressable ad durations determined by the advertisement duration accumulator 120 for that telecast across the monitored site×STB combinations. The advertisement duration aggregator 305 determines the aggregate total tuned advertisement duration for a given telecast by accumulating the total tuned ad durations determined by the advertisement duration accumulator 120 for that telecast across the monitored site×STB combinations.

An example of aggregate tuned advertisement durations, such as (i) an aggregate tuned addressable advertisement duration, (ii) and aggregate tuned under-addressable advertisement duration, and (iii) an aggregate total tuned advertisement duration, determined by the advertisement duration calculator 210 for a given telecast is illustrated in Table 8. The example aggregate tuned advertisement durations are determine by the advertisement duration aggregator 305 based on the example tuned advertisement durations of Table 7.

TABLE 8

Example aggregate tuned advertisement durations and factors

| Row | Telecast Date | Viewing Source | Program | Total Addressable | Total Under-Add | Total Seconds | Addressable Ad Factor (%) | Under-Addressable Ad Factor (%) |
|---|---|---|---|---|---|---|---|---|
| 1 | Jul. 20, 2019 | HGTV | House Hunters | 120 | 70 | 190 | 63.158% | 36.842% |

In the example of Table 8, the advertisement duration aggregator 305 aggregates the tuned addressable advertisement durations provided in Table 7 for the "House Hunter" telecast for both STB 1 (90 seconds) and STB 2 (30 seconds) to determine an aggregate tuned addressable advertisement duration of 120 seconds for the "House Hunter" telecast. Similarly, the advertisement duration aggregator 305 aggregates the tuned under-addressable advertisement durations provided in Table 7 for the "House Hunter" telecast for both STB 1 (45 seconds) and STB 2 (25 seconds) to determine an aggregate tuned under-addressable advertisement duration of 70 seconds for the "House Hunter" telecast. The advertisement duration aggregator 305 also aggregates the total tuned advertisement durations provided in Table 7 for the "House Hunter" telecast for both STB 1 (135 seconds) and STB 2 (55 seconds) to determine an aggregate total tuned advertisement duration of 190 seconds for the "House Hunter" telecast.

The ratio calculator 310 of the illustrated example uses the aggregate tuned advertisement durations determined by the advertisement duration aggregator 305 to determine one or more factors for a given telecast. In some examples, the ratio calculator 310 can use the aggregate tuned under-addressable advertisement duration and the aggregate total tuned advertisement duration determined by the advertisement duration aggregator 305 for a given telecast to determine an under-addressable advertisement factor for that given telecast. For example, the ratio calculator 310 can divide the aggregate tuned under-addressable advertisement duration for the given telecast by the aggregate total tuned advertisement duration for the given telecast to determine the under-addressable advertisement factor for that given telecast. In some examples, the ratio calculator 310 can use the aggregate tuned addressable advertisement duration and the aggregate total tuned advertisement duration determined by the advertisement duration aggregator 305 for a given telecast to determine an addressable advertisement factor for that given telecast. For example, the ratio calculator 310 can divide the aggregate tuned addressable advertisement duration for the given telecast by the aggregate total tuned advertisement duration for the given telecast to determine the addressable advertisement factor for that given telecast. In some examples, the ratio calculator 310 excludes addressable ads tuning that does not meet a qualification threshold (e.g., a 6 second threshold) from being used to calculate the addressable advertisement factor.

The example of Table 8 also includes an example addressable advertisement factor and an example under-addressable advertisement factor determined by the ratio calculator 310 for the "House Hunters" telecast. In this example, the ratio calculator 310 divides the aggregate tuned under-addressable advertisement duration for the "House Hunters" telecast (70 seconds) by the aggregate total tuned advertisement duration for the "House Hunters" telecast (190 seconds) to determine the under-addressable advertisement factor for the "House Hunters" telecast (0.36843=36.842%). Similarly, the ratio calculator 310 divides the aggregate tuned addressable advertisement duration for the "House Hunters" telecast (120 seconds) by the aggregate total tuned advertisement duration for the "House Hunters" telecast (190 seconds) to determine the addressable advertisement factor for the "House Hunters" telecast (0.63158=63.158%).

As described above, the advertisement ratings reporter 130 may adjust (e.g., scale, multiply, etc.) the input ratings data 150 for a given telecast based on the corresponding under-addressable advertisement factor determined for that telecast to determine the under-addressable advertisement ratings data 155 for that telecast. An example of such an under-addressable advertisement ratings computation is illustrated in Table 9, which is based on the example data included in Table 8. In the example of Table 9, the advertisement ratings reporter 130 receives input ratings data 150 that includes a base C3 impression rating for the "House Hunters" telecast of 30,123 impressions for commercials during that telecast. The advertisement ratings reporter 130 multiples the base C3 impression rating (30,123 impressions) by the under-addressable advertisement factor for the "House Hunters" telecast (0.36842=36.842%) to determine an output under-addressable advertisement rating of 11,098 for the "House Hunters" telecast.

example ad log data upload process 405 by which the ACP uploads its linear ad log data and addressable ad log data to a storage site, such as an FTP server, a cloud site, etc. The data orchestration framework 400 also includes an example RPD upload process 410 by which an AME implementing the under-addressable advertisement measurement system 100 accesses RPD from an MVPD and stores it to a storage site, such as an FTP server, a cloud site, etc. The RPD upload process 410 can also be used to retrieve the ACP's ad log data uploaded by the ad log data upload process 405. The data orchestration framework 400 further includes an example event driven data refinement process 415 and an example time driven data refinement process 420. The event driven data refinement process 415 queues and performs one or more data refinement procedures on the RPD data and ad log data based on occurrence of one or more events, such as the amount of data reaching a threshold, a processor capacity threshold being met, etc. The time driven data refinement process 420 performs one or more data refinement procedures on the RPD data and ad log data based on one or more elapsed time durations being met (e.g., such as causing the data refinement procedures to be performed on daily basis and/or at some other interval(s), etc.).

Figure 5:
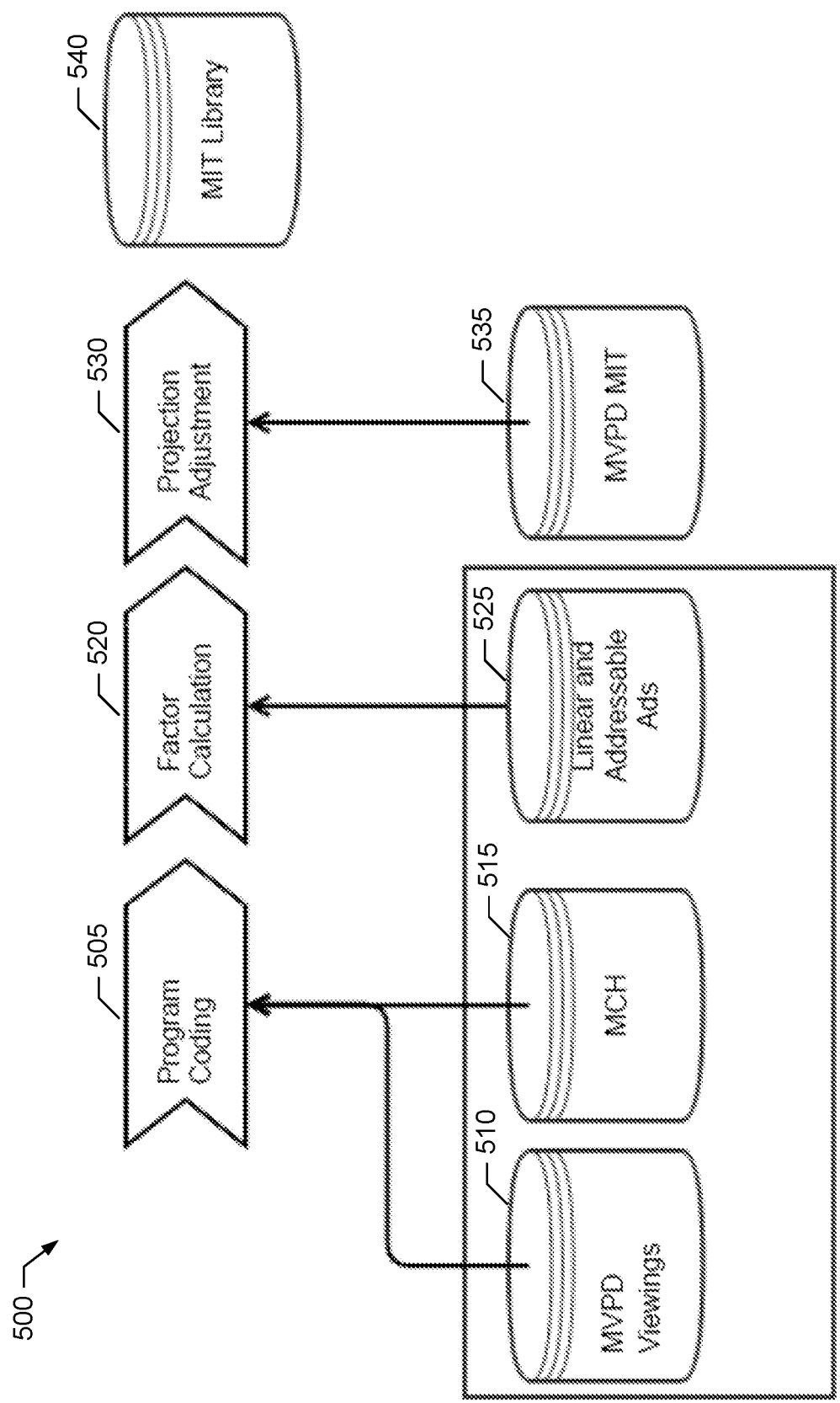
FIG. 5 illustrates an example process flow that may be implemented by the example under-addressable advertisement measurement system of FIG. 1.

An example process flow 500 that may be implemented by the example under-addressable advertisement measurement system 100 of FIG. 1 is illustrated in FIG. 5. In the illustrated example, the process 500 begins with an example program coding operation 505 that combines example raw RPD 510 provided by an MVPD with example channel lineup information 515 to determine RPD (e.g., the RPD 135) that identifies telecasts tuned at the monitored sites (e.g., by set top boxes) represented by the raw RPD 510. The process 500 also includes an example factor calculation operation 520 calculates respective under-addressable advertisement factors for the different telecasts represented in the RPD. The process 500 calculates the under-addressable advertisement factors based on example ad log data 525 provided by the ACP (e.g., which may include the linear ad log data 140 and the addressable ad log data 145). The process 500 further includes an example projection adjustment process 530 to adjust example input ratings data 535 based on the under-addressable advertisement factors calculated for the respective telecasts to determine example under-addressable ratings data 540 for the respective telecasts.

While an example manner of implementing the under-addressable advertisement measurement system 100 is illustrated in FIGS. 1-5, one or more of the elements, processes

TABLE 9

Example under-addressable ratings data

| Row | Telecast Date | Viewing Source | Program | Start Time | End Time | C3 Impressions | Under-Addressable Ad Factor (%) | Under-Addressable C3 Impressions |
|---|---|---|---|---|---|---|---|---|
| 1 | Jul. 20, 2019 | HGTV | House Hunters | 8:00 p | 8:30 p | 30,123 | 36.842% | 11,098 |

Figure 4:
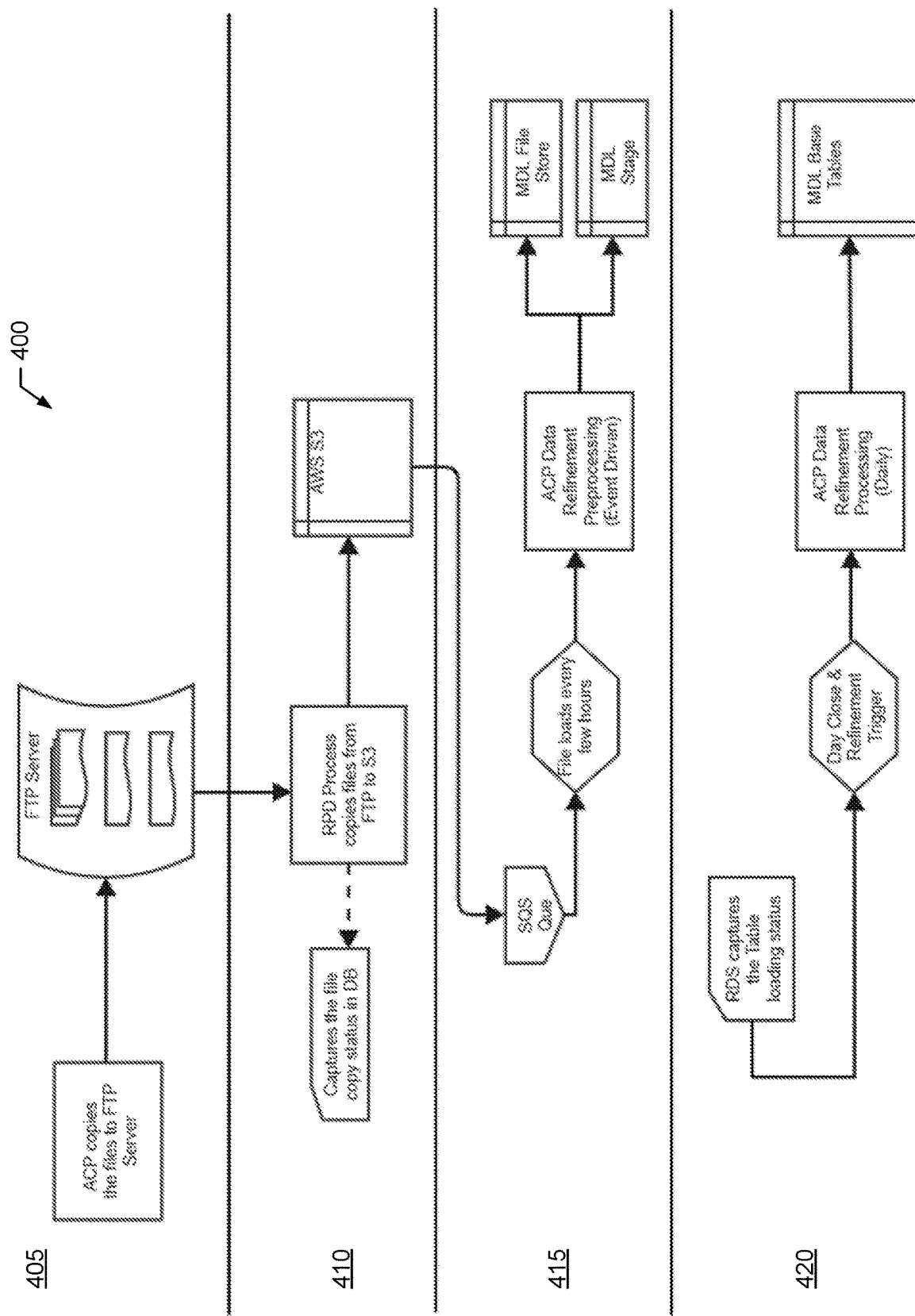
FIG. 4 illustrates an example data orchestration framework that may be used to collect example return path data, linear advertisement log data and addressable advertisement log data to be processed by the example under-addressable advertisement measurement system of FIG. 1.

An example data orchestration framework 400 that may be used to collect the example return path data 135, the example linear advertisement log data 140 and the example addressable advertisement log data 145 to be processed by the example under-addressable advertisement measurement system 100 of FIG. 1 is illustrated in FIG. 4. In the illustrated example, the data orchestration framework 400 includes an and/or devices illustrated in FIGS. 1-5 may be combined, divided, re-arranged, omitted, eliminated and/or implemented in any other way. Further, the example return path data pre-processor 105, the example linear advertisement log pre-processor 110, the example addressable advertisement log pre-processor 115, the example advertisement duration accumulator 120, the example adjustment factor calculator 125, the example advertisement ratings reporter 130, the example data reconciler 205, the example advertisement duration calculator 210, the example advertisement duration aggregator 305, the example ratio calculator 310 and/or, more generally, the example under-addressable advertisement measurement system 100 may be implemented by hardware, software, firmware and/or any combination of hardware, software and/or firmware. Thus, for example, any of the example return path data pre-processor 105, the example linear advertisement log pre-processor 110, the example addressable advertisement log pre-processor 115, the example advertisement duration accumulator 120, the example adjustment factor calculator 125, the example advertisement ratings reporter 130, the example data reconciler 205, the example advertisement duration calculator 210, the example advertisement duration aggregator 305, the example ratio calculator 310 and/or, more generally, the example under-addressable advertisement measurement system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example under-addressable advertisement measurement system 100, the example return path data pre-processor 105, the example linear advertisement log pre-processor 110, the example addressable advertisement log pre-processor 115, the example advertisement duration accumulator 120, the example adjustment factor calculator 125, the example advertisement ratings reporter 130, the example data reconciler 205, the example advertisement duration calculator 210, the example advertisement duration aggregator 305 and/or the example ratio calculator 310 is/are hereby expressly defined to include a non-transitory computer readable storage device or storage disk such as a memory, a digital versatile disk (DVD), a compact disk (CD), a Blu-ray disk, etc. including the software and/or firmware. Further still, the example the example under-addressable advertisement measurement system 100 may include one or more elements, processes and/or devices in addition to, or instead of, those illustrated in FIGS. 1-5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
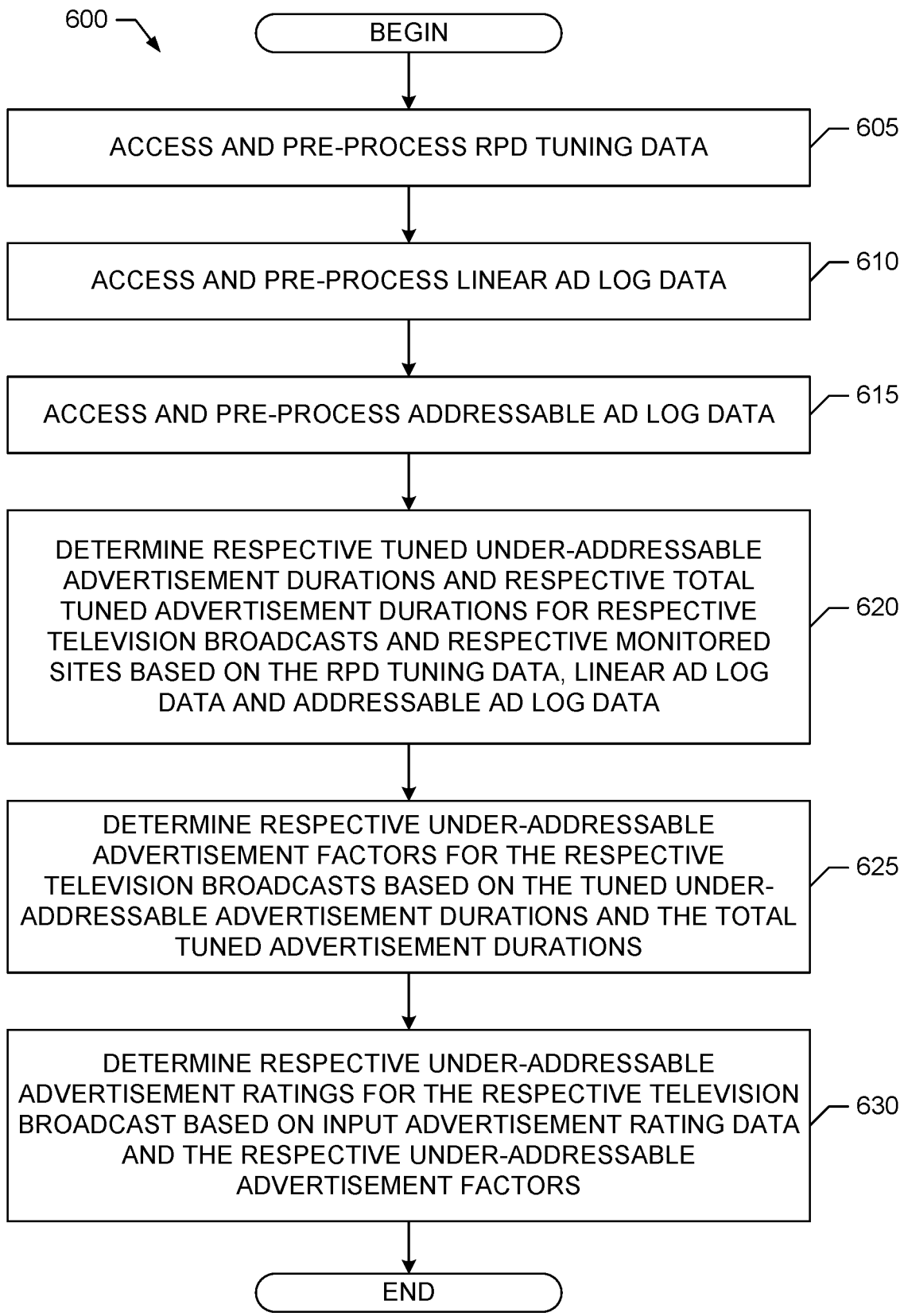
FIG. 6 is a flowchart representative of example machine readable instructions that may be executed to implement the example under-addressable advertisement measurement system of FIG. 1.
Figure 7:
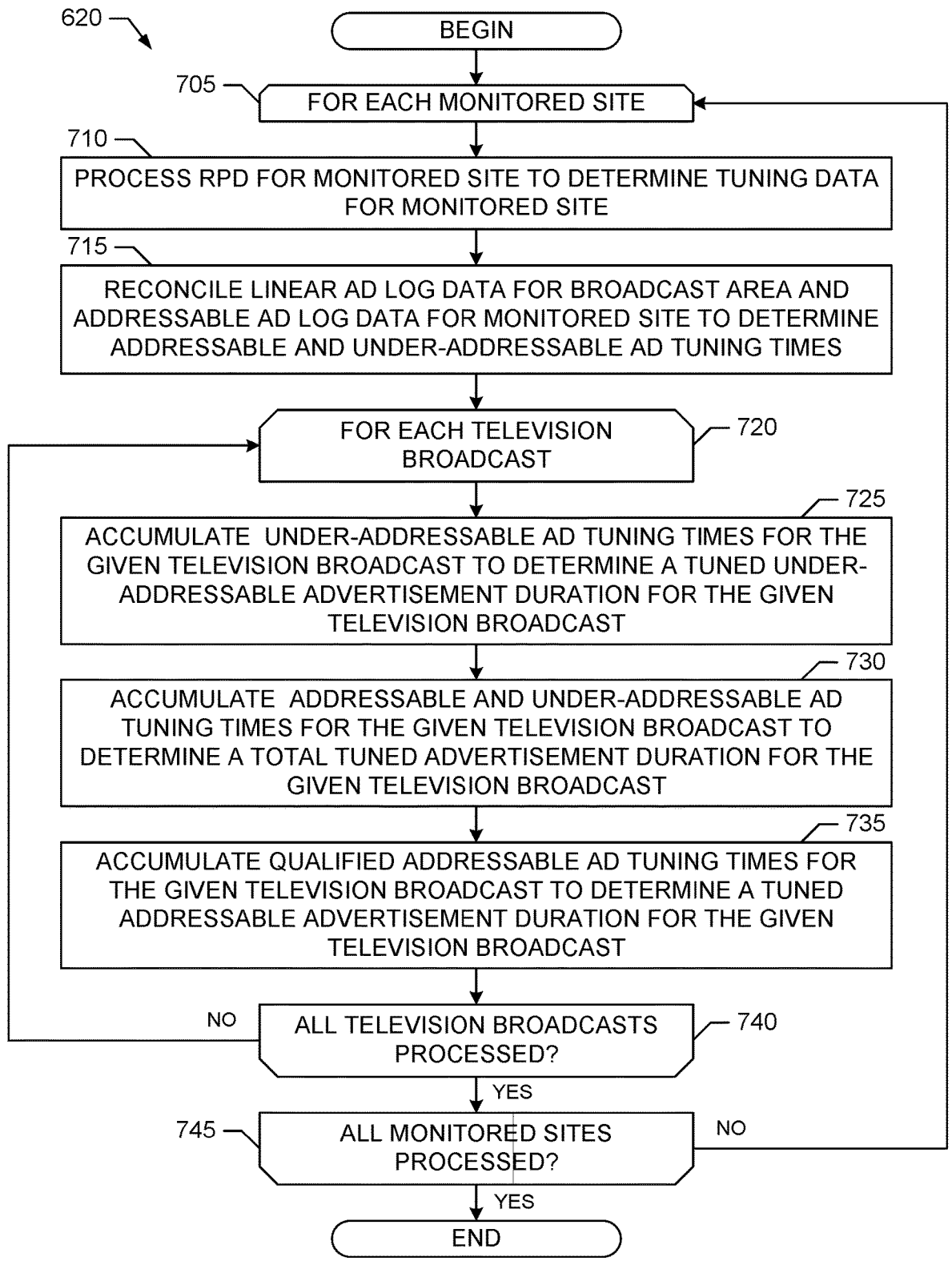
FIG. 7 is a flowchart representative of example machine readable instructions that may be executed to implement the example advertisement duration accumulator of FIGS. 1 and/or 2.
Figure 8:
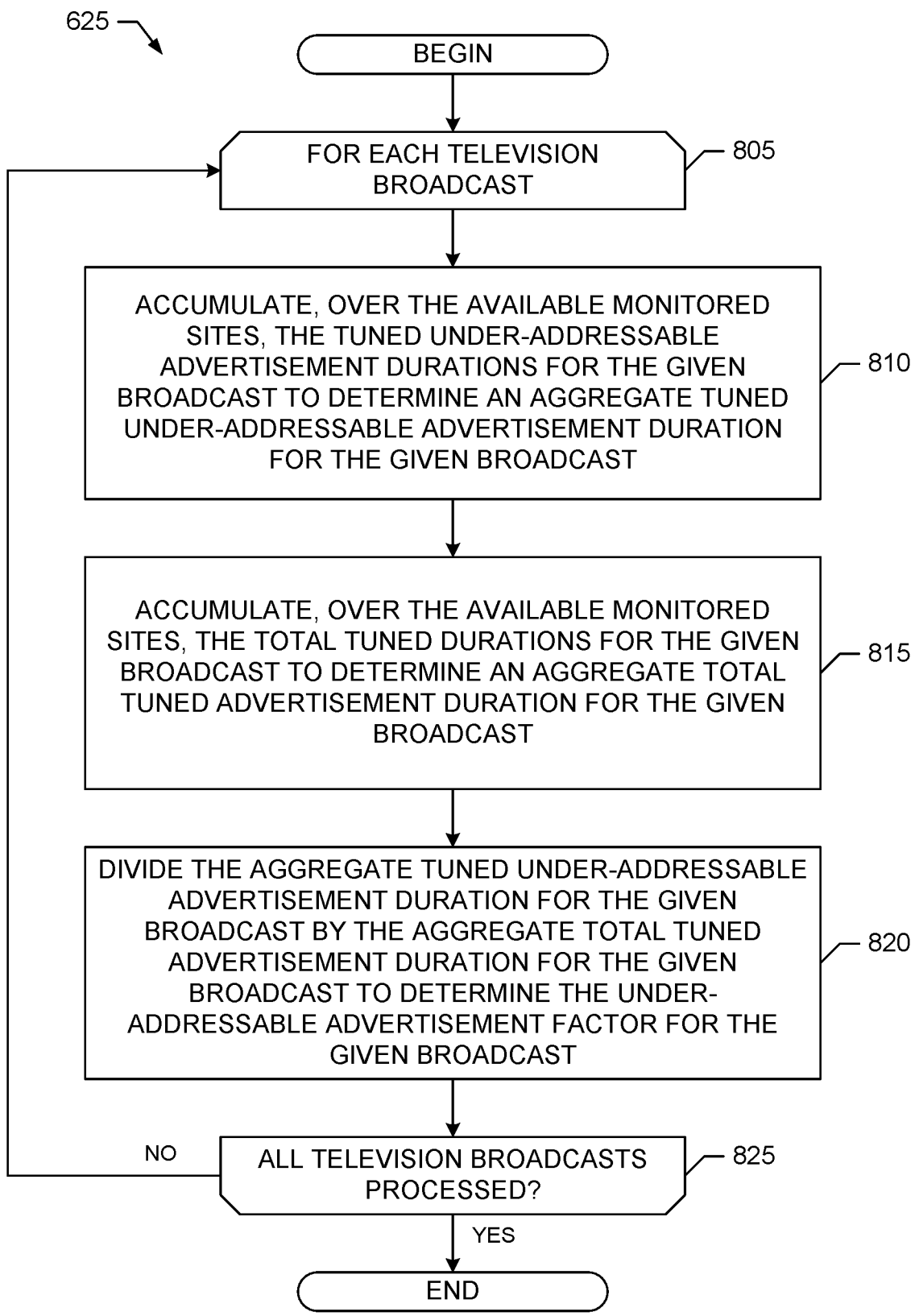
FIG. 8 is a flowchart representative of example machine readable instructions that may be executed to implement the example adjustment factor calculator of FIGS. 1 and/or 3.

Flowcharts representative of example hardware logic, machine readable instructions, hardware implemented state machines, and/or any combination thereof for implementing the example under-addressable advertisement measurement system 100 are shown in FIGS. 6-8. In these examples, the machine readable instructions may be one or more executable programs or portion(s) of an executable program for execution by a computer processor, such as the processor 912 shown in the example processor platform 900 discussed below in connection with FIG. 9. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processor 912, but the entire program or programs and/or parts thereof could alternatively be executed by a device other than the processor 912 and/or embodied in firmware or dedicated hardware. Further, although the example program(s) is(are) described with reference to the flowcharts illustrated in FIGS. 6-8, many other methods of implementing the example under-addressable advertisement measurement system 100 may alternatively be used. For example, with reference to the flowcharts illustrated in FIGS. 6-8, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by a processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 6-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

An example program 600 that may be executed to implement the example under-addressable advertisement measurement system 100 is represented by the flowchart shown in FIG. 6. With reference to the preceding figures and associated written descriptions, the example program 600 of FIG. 6 begins execution at block 605 at which the return path data pre-processor 105 of the under-addressable advertisement measurement system 100 accesses and pre-processes the input RPD 135 to generate RPD tuning data 160 to be used to determine under-addressable advertisement ratings data, as described above. For example, the return path data pre-processor 105 may prepare the RPD tuning 160 by performing program-coding and minute exploding of the input RPD 135, as described above.

At block 610, the linear advertisement log pre-processor 110 of the under-addressable advertisement measurement system 100 accesses and pre-processes the input linear ad log data 140 to generate the filtered linear ad log data 165 to be used to determine under-addressable advertisement ratings data, as described above. For example, the linear advertisement log pre-processor 110 may prepare the filter linear (under-addressable) ad log data 164 by applying one or more filters, computing ad start and end times, identifying consecutive linear ads that belong to a single ad pod, and performing minute-exploding, as described above.

At block 615, the addressable advertisement log pre-processor 115 of the under-addressable advertisement measurement system 100 accesses and pre-processes the input addressable ad log data 145 to generate the filtered addressable ad log data 170 to be used to determine under-addressable advertisement ratings data, as described above. For example, the addressable advertisement log pre-processor 115 may prepare the filtered addressable ad log data 170 by applying one or more filters, computing ad start and end times, identifying consecutive addressable ads that belong to a single ad pod, identifying addressable ads that meet the ACP's qualification rule, and performing minute-exploding, as described above.

At block 620, the advertisement duration accumulator 120 of the under-addressable advertisement measurement system 100 determines, as described above, respective tuned addressable advertisement durations, respective tuned under-addressable advertisement durations, and total tuned advertisement durations for respective combinations of telecast and monitored sites (e.g., set top boxes) included in the RPD footprint based on the RPD tuning data 160, the filtered linear ad log data 165 and the filtered addressable ad log data 170 determined at the preceding blocks. For example, the advertisement duration accumulator 120 may merge (e.g., reconcile) the RPD tuning data with the under-addressable and addressable ad logs, as described above, to determine tuned addressable and under-addressable advertisement durations for each telecast and monitored site (e.g., set top box) combination included in the RPD footprint. An example program that may be executed to perform the processing at block 620 is illustrated in FIG. 7, which is described in further detail below.

At block 625, the adjustment factor calculator 125 of the under-addressable advertisement measurement system 100 determines, as described above, under-addressable advertisements factors for respective telecasts included in the RPD footprint based on the under-addressable advertisement durations and total tuned advertisement durations determined at block 620. For example, the adjustment factor calculator 125 may determine the total number of under-addressable and addressable seconds viewed for each tuned commercial minute across all monitored sites (e.g., and set top boxes and/or other devices), and compute the ratio of under-addressable ad seconds to total ad seconds for each telecast to determine the under-addressable advertisement factory for each telecast. In some examples, the adjustment factor calculator 125 also determines, as described above, addressable advertisements factors for respective telecasts included in the RPD footprint based on the addressable advertisement durations and total tuned advertisement durations determined at block 620. An example program that may be executed to perform the processing at block 625 is illustrated in FIG. 8, which is described in further detail below.

At block 630, the advertisement ratings reporter 130 determines, as described above, respective under-addressable advertisement ratings (e.g., under-addressable C3 impressions) for the respective telecasts included in the RPD footprint based on input ratings data (e.g., base C3 impressions) and the respective under-addressable advertisements factors determined for the telecasts at block 625. For example, the advertisement ratings reporter 130 computes the under-addressable C3 impressions for a given telecast by multiplying the base MVPD C3 impressions for that telecast by the under-addressable factor for that telecast.

An example program 620 that may be executed to implement the example advertisement duration accumulator 120 of the example under-addressable advertisement measurement system 100, and/or to perform the processing at block 620 of FIG. 6, is represented by the flowchart shown in FIG. 7. With reference to the preceding figures and associated written descriptions, the example program 620 of FIG. 7 begins execution at block 705 at which the data reconciler 205 of the advertisement duration accumulator 120 begins iterating over each monitored site (e.g., set top box) represented in the RPD tuning data 160. At block 710, the data reconciler 205 processes the RPD tuning data 160 to determine, as described above, program coded tuning data for a given monitored site (e.g., given set top box) corresponding to the current iteration. At block 715, the data reconciler 205 reconciles, as described above, the filtered linear ad log data 165, the filtered addressable ad log data 170 and the program coded RPD tuning data to determine addressable and under-addressable ad tuning times for the different telecasts tuned at the given monitored site (e.g., by the given set top box), as represented in the program coded RPD tuning data.

At block 720, the advertisement duration calculator 210 of the advertisement duration accumulator 120 begins iterating over each telecast tuned by the given monitored site (e.g., given set top box) corresponding to the current iteration. At block 725, the advertisement duration calculator 210 accumulates, as described above, the under-addressable ad tuning times determined by the data reconciler 205 for the given telecast corresponding to the current iteration to determine a tuned under-addressable advertisement duration for the given telecast and given monitored site (e.g., given set top box) combination. At block 730, the advertisement duration calculator 210 accumulates, as described above, the addressable ad tuning times and the under-addressable ad tuning times determined by the data reconciler 205 for the given telecast corresponding to the current iteration to determine a total tuned advertisement duration for the given telecast and given monitored site (e.g., given set top box) combination. At block 730, the advertisement duration calculator 210 accumulates, as described above, the qualified addressable ad tuning times determined by the data reconciler 205 for the given telecast corresponding to the current iteration to determine a tuned addressable advertisement duration for the given telecast and given monitored site (e.g., given set top box) combination.

At block 740, the advertisement duration calculator 210 continues iterating until all telecasts have been processed. At block 745, the data reconciler 205 continues iterating until all monitored sites (e.g., set top boxes) have been processed.

An example program 625 that may be executed to implement the example adjustment factor calculator 125 of the example under-addressable advertisement measurement system 100, and/or to perform the processing at block 625 of FIG. 6, is represented by the flowchart shown in FIG. 8. With reference to the preceding figures and associated written descriptions, the example program 625 of FIG. 8 begins execution at block 805 at which the adjustment factor calculator 125 iterates over the respective telecasts included in the RPD footprint. At block 810, the advertisement duration aggregator 305 of the adjustment factor calculator 125 accumulates, as described above, the tuned under-addressable advertisement durations determined for the given telecast corresponding to the current iteration and for the different monitored sites (e.g., set top boxes) included in the RPD footprint to determine an aggregate tuned under-addressable advertisement duration for the given broadcast. At block 815, the advertisement duration aggregator 305 accumulates, as described above, the total tuned advertisement durations determined for the given telecast and for the different monitored sites (e.g., set top boxes) included in the RPD footprint to determine an aggregate total tuned advertisement duration for the given broadcast. At block 820, the ratio calculator 310 of the adjustment factor calculator 125 divides the aggregate tuned under-addressable advertisement duration for the given telecast by the aggregate total tuned advertisement duration for the given telecast to determine the under-addressable advertisement factor for the given telecast, as described above. At block 825, the adjustment factor calculator 125 continues iterating until all telecasts have been processed.

Figure 9:
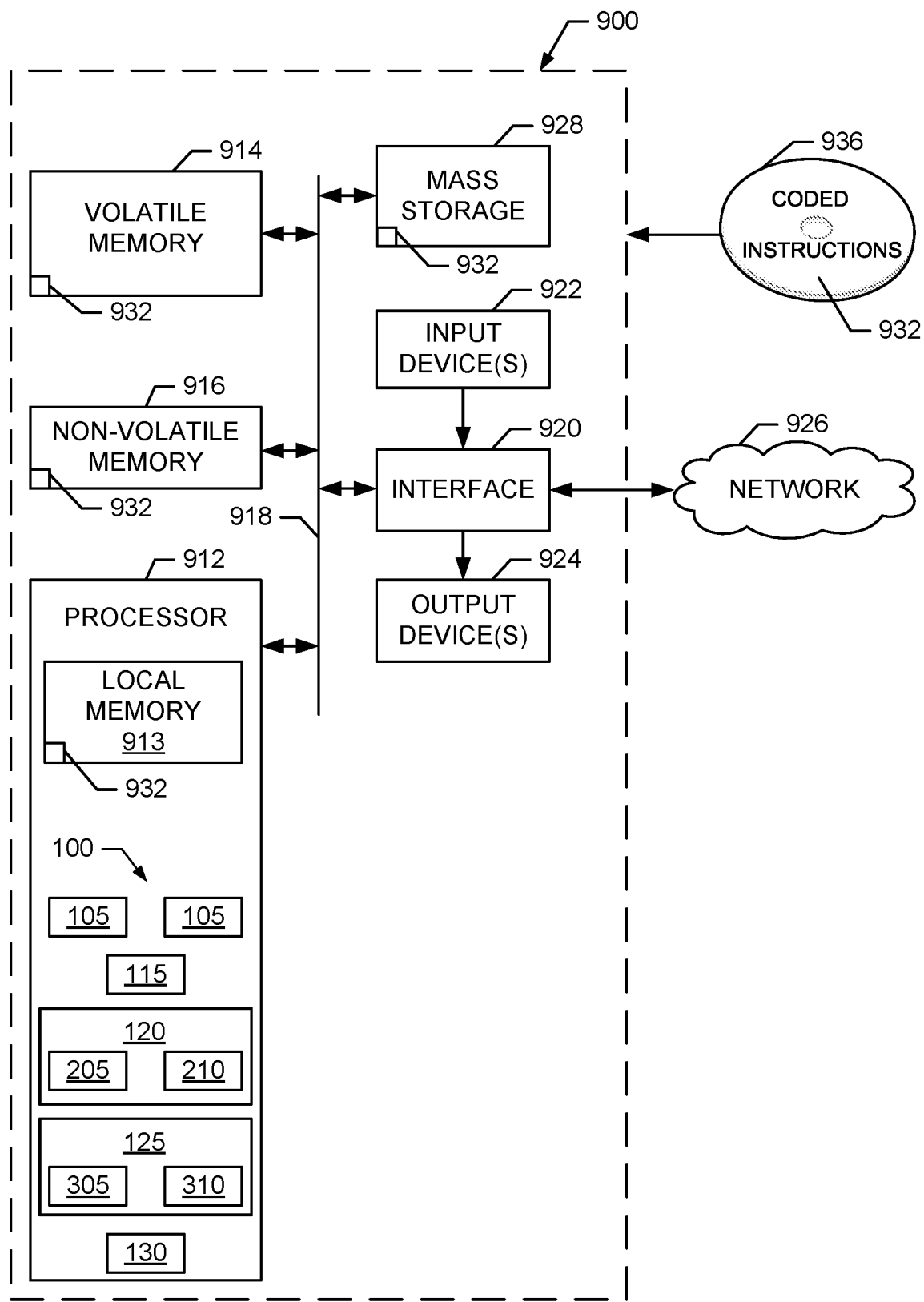
FIG. 9 is a block diagram of an example processor platform structured to execute the example machine readable instructions of FIGS. 6, 7 and/or 8 to implement the under-addressable advertisement measurement system of FIG. 1, the example advertisement duration accumulator of FIGS. 1 and/or 2, and/or the example adjustment factor calculator of FIGS. 1 and/or 3.

FIG. 9 is a block diagram of an example processor platform 900 structured to execute the instructions of FIGS. 6, 7 and/or 8 to implement the example under-addressable advertisement measurement system 100 of FIGS. 1-5. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor 912 may be a semiconductor based (e.g., silicon based) device. In this example, the processor 912 implements the example return path data pre-processor 105, the example linear advertisement log pre-processor 110, the example addressable advertisement log pre-processor 115, the example advertisement duration accumulator 120, the example adjustment factor calculator 125, the example advertisement ratings reporter 130, the example data reconciler 205, the example advertisement duration calculator 210, the example advertisement duration aggregator 305, the example ratio calculator 310 and/or, more generally, the example under-addressable advertisement measurement system 100.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAIVIBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, a trackbar, isopoint and/or a voice recognition system and/or any other human-machine interface. Also, many systems, such as the processor platform 900, can allow the user to control the computer system and provide data to the computer using physical gestures, such as, but not limited to, hand or body movements, facial expressions, and face recognition.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 corresponding to the instructions of FIGS. 6, 7 and/or 8 may be stored in the mass storage device 928, in the volatile memory 914, in the non-volatile memory 916, in the local memory 913 and/or on a removable non-transitory computer readable storage medium, such as a CD or DVD 936.

Figure 10:
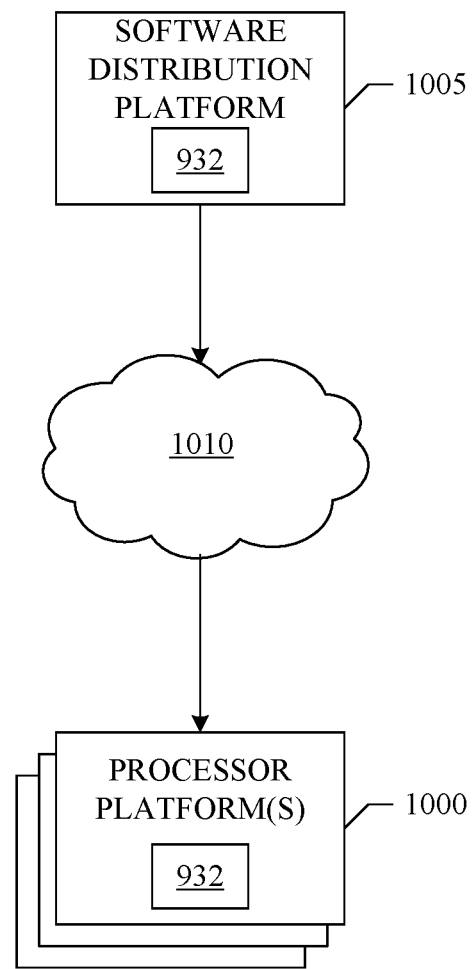
FIG. 10 is a block diagram of an example software distribution platform to distribute software (e.g., software corresponding to the example computer readable instructions of FIGS. 6, 7 and/or 8) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1005 to distribute software such as the example computer readable instructions 932 of FIG. 9 to third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 932 of FIG. 9. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the computer readable instructions 932, which may correspond to the example computer readable instructions 600, 620 and/or 625 of FIGS. 6, 7 and/or 8, as described above. The one or more servers of the example software distribution platform 1005 are in communication with a network 1010, which may correspond to any one or more of the Internet and/or any of the example networks, such as the network 926, described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 932 from the software distribution platform 1005. For example, the software, which may correspond to the example computer readable instructions 600, 620 and/or 625 of FIGS. 6, 7 and/or 8, may be downloaded to the example processor platform 900, which is to execute the computer readable instructions 932 to implement the under-addressable advertisement measurement system 100. In some example, one or more servers of the software distribution platform 1005 periodically offer, transmit, and/or force updates to the software (e.g., the example computer readable instructions 932 of FIG. 9) to ensure improvements, patches, updates, etc. are distributed and applied to the software at the end user devices.

From the foregoing, it will be appreciated that example methods, apparatus and articles of manufacture have been disclosed that implement under-addressable advertisement measurement. The disclosed methods, apparatus and articles of manufacture improve the efficiency of using a computing device by improving the accuracy of measuring addressable vs. under-addressable advertisement impressions made with computing devices, such as media devices (e.g., televisions, set top boxes, etc.). Such accurate ratings measurements can, for example, be used to addressable advertisement delivery to improve efficiency. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to perform under-addressable advertisement measurement, the apparatus comprising:
    a pre-processor to:
        access return-path tuning data from a first plurality of set-top boxes associated with a plurality of monitored sites; and
        exclude ones of the first plurality of set-top boxes determined to be out of compliance based on the return-path tuning data to yield a second plurality of set-top boxes associated with a subset of the monitored sites;
    an advertisement duration accumulator to determine a tuned under-addressable advertisement duration and a total tuned advertisement duration for a first television broadcast at a first monitored site of the subset of the monitored sites, the tuned under-addressable advertisement duration and the total tuned advertisement duration determined based on (i) first return-path tuning data associated with the first monitored site, (ii) linear advertisement log data associated with a broadcast area including the first monitored site, and (iii) addressable advertisement log data associated with the first monitored site;
    an advertisement factor calculator to determine an under-addressable advertisement factor for the first television broadcast based on the tuned under-addressable advertisement duration and the total tuned advertisement duration; and
    an advertisement ratings reporter to adjust an input advertisement rating for the first television broadcast based on the under-addressable advertisement factor to determine an under-addressable advertisement rating for the first television broadcast.

2. The apparatus of claim 1, wherein the tuned under-addressable advertisement duration is a first tuned under-addressable advertisement duration for the first television broadcast at the first monitored site, the total tuned advertisement duration is a first total tuned advertisement duration for the first television broadcast at the first monitored site, and the advertisement factor calculator is to:
    accumulate at least the first tuned under-addressable advertisement duration for the first television broadcast at the first monitored site and a second tuned under-addressable advertisement duration for the first television broadcast at a second monitored site of the subset of the monitored sites to determine an aggregate tuned under-addressable advertisement duration for the first television broadcast;
    accumulate at least the first total tuned advertisement duration for the first television broadcast at the first monitored site and a second total tuned advertisement duration for the first television broadcast at the second monitored site to determine an aggregate total tuned advertisement duration for the first television broadcast; and
    determine the under-addressable advertisement factor for the first television broadcast based on the aggregate tuned under-addressable advertisement duration and the aggregate total tuned advertisement duration.

3. The apparatus of claim 2, wherein the advertisement factor calculator is to divide the aggregate tuned under-addressable advertisement duration by the aggregate total tuned advertisement duration to determine the under-addressable advertisement factor.

4. The apparatus of claim 1, wherein the input advertisement rating is representative of a number of advertisement impressions associated with the first television broadcast, and the advertisement ratings reporter is to multiply the input advertisement rating for the first television broadcast by the under-addressable advertisement factor to determine the under-addressable advertisement rating for the first television broadcast.

5. The apparatus of claim 1, wherein the first monitored site corresponds to a first set-top box in the second plurality of set-top boxes, and the first return-path tuning data associated with the first monitored site is obtained from the first set-top box.

6. The apparatus of claim 1, further including a linear advertisement log pre-processor to:
    segment the linear advertisement log data to have first log entries with one-minute granularities; and
    aggregate ones of the first log entries for a plurality of linear advertisements included in a single advertisement pod to determine second log entries for the advertisement pod, the second log entries having one-minute granularities, wherein the advertisement duration accumulator is to determine the tuned under-addressable advertisement duration and the total tuned advertisement duration based, at least in part, on the second log entries.

7. The apparatus of claim 1, further including an addressable advertisement log pre-processor to:
    segment the addressable advertisement log data to have first log entries with one-minute granularities;
    identify ones of the first log entries associated with one or more addressable advertisements having respective tuned durations that do not satisfy a threshold;
    classify the ones of the first log entries as unqualified log entries; and
    aggregate ones of the first log entries for a plurality of addressable advertisements included in a single advertisement pod to determine second log entries for the advertisement pod, the second log entries having one-minute granularities, wherein the advertisement duration accumulator is to determine the total tuned advertisement duration based, at least in part, on the second log entries.

8. The apparatus of claim 1, wherein the advertisement factor calculator is further to:
    determine a tuned addressable advertisement duration for the first television broadcast at the first monitored site, the tuned addressable advertisement duration to exclude one or more addressable advertisements tuned at the first monitored site for less than a threshold duration;
    determine the total tuned advertisement duration for the first television broadcast at the first monitored site to include at least the one or more addressable advertisements tuned at the first monitored site for less than the threshold duration; and
    determine an addressable advertisement factor for the first television broadcast based on the tuned addressable advertisement duration and the total tuned advertisement duration.

9. At least one non-transitory computer readable medium comprising computer readable instructions that, when executed, cause one or more processors to at least:
    access return-path tuning data from a first plurality of set-top boxes associated with a plurality of monitored sites; and
    exclude ones of the first plurality of set-top boxes determined to be out of compliance based on the return-path tuning data to yield a second plurality of set-top boxes associated with a subset of the monitored sites;
    determine a tuned under-addressable advertisement duration and a total tuned advertisement duration for a first television broadcast at a first monitored site of the subset of the monitored sites, the tuned under-addressable advertisement duration and the total tuned advertisement duration determined based on (i) first return-path tuning data associated with the first monitored site, (ii) linear advertisement log data associated with a broadcast area including the first monitored site, and (iii) addressable advertisement log data associated with the first monitored site;
    determine an under-addressable advertisement factor for the first television broadcast based on the tuned under-addressable advertisement duration and the total tuned advertisement duration; and
    adjust an input advertisement rating for the first television broadcast based on the under-addressable advertisement factor to determine an under-addressable advertisement rating for the first television broadcast.

10. The at least one non-transitory computer readable medium of claim 9, wherein the tuned under-addressable advertisement duration is a first tuned under-addressable advertisement duration for the first television broadcast at the first monitored site, the total tuned advertisement duration is a first total tuned advertisement duration for the first television broadcast at the first monitored site, and the instructions cause the one or more processors to:
    accumulate at least the first tuned under-addressable advertisement duration for the first television broadcast at the first monitored site and a second tuned under-addressable advertisement duration for the first television broadcast at a second monitored site of the subset of the monitored sites to determine an aggregate tuned under-addressable advertisement duration for the first television broadcast;
    accumulate at least the first total tuned advertisement duration for the first television broadcast at the first monitored site and a second total tuned advertisement duration for the first television broadcast at the second monitored site to determine an aggregate total tuned advertisement duration for the first television broadcast; and
    determine the under-addressable advertisement factor for the first television broadcast based on the aggregate tuned under-addressable advertisement duration and the aggregate total tuned advertisement duration.

11. The at least one non-transitory computer readable medium of claim 10, wherein the instructions cause the one or more processors to divide the aggregate tuned under-addressable advertisement duration by the aggregate total tuned advertisement duration to determine the under-addressable advertisement factor.

12. The at least one non-transitory computer readable medium of claim 9, wherein the input advertisement rating is representative of a number of advertisement impressions associated with the first television broadcast, and the instructions cause the one or more processors to multiply the input advertisement rating for the first television broadcast by the under-addressable advertisement factor to determine the under-addressable advertisement rating for the first television broadcast.

13. The at least one non-transitory computer readable medium of claim 9, wherein the first monitored site corresponds to a first set-top box, and the first return-path tuning data associated with the first monitored site is obtained from the first set-top box.

14. The at least one non-transitory computer readable medium of claim 9, wherein the instructions cause the one or more processors to:
    determine a tuned addressable advertisement duration for the first television broadcast at the first monitored site, the tuned addressable advertisement duration to exclude one or more addressable advertisements tuned at the first monitored site for less than a threshold duration;
    determine the total tuned advertisement duration for the first television broadcast at the first monitored site to include at least the one or more addressable advertisements tuned at the first monitored site for less than the threshold duration; and
    determine an addressable advertisement factor for the first television broadcast based on the tuned addressable advertisement duration and the total tuned advertisement duration.

15. A method to perform under-addressable advertisement measurement, the method comprising:
    accessing return-path tuning data from a first plurality of set-top boxes associated with a plurality of monitored sites; and
    excluding, by executing an instruction with at least one processor, ones of the first plurality of set-top boxes determined to be out of compliance based on the return-path tuning data to yield a second plurality of set-top boxes associated with a subset of the monitored sites;
    determining, by executing an instruction with the at least one processor, a tuned under-addressable advertisement duration and a total tuned advertisement duration for a first television broadcast at a first monitored site of the subset of the monitored sites, the tuned under-addressable advertisement duration and the total tuned advertisement duration determined based on (i) first return-path tuning data associated with the first monitored site, (ii) linear advertisement log data associated with a broadcast area including the first monitored site, and (iii) addressable advertisement log data associated with the first monitored site;
    determining, by executing an instruction with the at least one processor, an under-addressable advertisement factor for the first television broadcast based on the tuned under-addressable advertisement duration and the total tuned advertisement duration; and
    adjusting, by executing an instruction with the at least one processor, an input advertisement rating for the first television broadcast based on the under-addressable advertisement factor to determine an under-addressable advertisement rating for the first television broadcast.

16. The method of claim 15, wherein the tuned under-addressable advertisement duration is a first tuned under-addressable advertisement duration for the first television broadcast at the first monitored site, the total tuned advertisement duration is a first total tuned advertisement duration for the first television broadcast at the first monitored site, and further including:

accumulating at least the first tuned under-addressable advertisement duration for the first television broadcast at the first monitored site and a second tuned under-addressable advertisement duration for the first television broadcast at a second monitored site of the subset of the monitored sites to determine an aggregate tuned under-addressable advertisement duration for the first television broadcast;

accumulating at least the first total tuned advertisement duration for the first television broadcast at the first monitored site and a second total tuned advertisement duration for the first television broadcast at the second monitored site to determine an aggregate total tuned advertisement duration for the first television broadcast; and determining the under-addressable advertisement factor for the first television broadcast based on the aggregate tuned under-addressable advertisement duration and the aggregate total tuned advertisement duration.

17. The method of claim 16, wherein the determining of the under-addressable advertisement factor for the first television broadcast includes dividing the aggregate tuned under-addressable advertisement duration by the aggregate total tuned advertisement duration to determine the under-addressable advertisement factor.

18. The method of claim 15, wherein the input advertisement rating is representative of a number of advertisement impressions associated with the first television broadcast, and the adjusting of the input advertisement rating for the first television broadcast includes multiplying the input advertisement rating for the first television broadcast by the under-addressable advertisement factor to determine the under-addressable advertisement rating for the first television broadcast.

19. The method of claim 15, wherein the first monitored site corresponds to a first set-top box, and the first return-path tuning data associated with the first monitored site is obtained from the first set-top box.

20. The method of claim 15, further including:
determining a tuned addressable advertisement duration for the first television broadcast at the first monitored site, the tuned addressable advertisement duration to exclude one or more addressable advertisements tuned at the first monitored site for less than a threshold duration;

determining the total tuned advertisement duration for the first television broadcast at the first monitored site to include at least the one or more addressable advertisements tuned at the first monitored site for less than the threshold duration; and determining an addressable advertisement factor for the first television broadcast based on the tuned addressable advertisement duration and the total tuned advertisement duration.

\* \* \* \* \*